US011892049B2

(12) United States Patent
Ruiz Dealbert et al.

(10) Patent No.: US 11,892,049 B2
(45) Date of Patent: Feb. 6, 2024

(54) SINGLE-LEAF SPRING MADE FROM COMPOSITE MATERIAL WITH A POLYMER MATRIX AND MANUFACTURING METHOD FOR SAID LEAF SPRING (71) Applicant: MBHA Projects S.L., Villareal (ES)

(72) Inventors: Miguel Ruiz Dealbert, Villarreal (ES); Roberto Estal Vera, Villarreal (ES); Juan Salamero Laorden, Villarreal (ES)

(73) Assignee: MBHA Projects S.L., Villareal (ES)

( * ) Notice: Subject to any disclaimer, the term of this patent is extended or adjusted under 35 U.S.C. 154(b) by 1052 days.

(21) Appl. No.: 16/474,912

(22) PCT Filed: Dec. 27, 2017

(86) PCT No.: PCT/ES2017/070850
§ 371 (c)(1),
(2) Date: Jun. 28, 2019

(87) PCT Pub. No.: WO2018/122432
PCT Pub. Date: Jul. 5, 2018

(65) Prior Publication Data
US 2019/0331187 A1 Oct. 31, 2019

(30) Foreign Application Priority Data
Dec. 28, 2016 (EP) ...................... 16382664

(51) Int. Cl.
*F16F 1/368* (2006.01)
*B29B 11/06* (2006.01)
(Continued)

(52) U.S. Cl.
CPC .............. *F16F 1/368* (2013.01); *B29B 11/06* (2013.01); *B29C 70/48* (2013.01); *B32B 5/26* (2013.01);
(Continued)

(58) Field of Classification Search
CPC ..................... F16F 1/368; F16F 1/3686; F16F 2224/0208; F16F 2224/0241;
(Continued)

(56) References Cited

U.S. PATENT DOCUMENTS 4,659,071 A  4/1987 Woltron
4,786,033 A  11/1988 Kofler
(Continued)

FOREIGN PATENT DOCUMENTS

DE  102011104071 A1  12/2012
EP    0225485 A1   6/1987
(Continued)

OTHER PUBLICATIONS

Machine Translation of JP S57-124141A. (Year: 1982).*
Machine Translation of DE 10 2011 104071 A1. (Year: 2012).*
International Search Report; priority document.

*Primary Examiner* — Brian Handville
(74) *Attorney, Agent, or Firm* — Greer, Burns & Crain, Ltd.

(57) ABSTRACT

A single-leaf spring comprising a body and two eyes located at the ends of the body, with the body having an upper side and a lower side, that comprises at least one composite material sheet comprising a series of fiber sheets embedded in a polymer matrix to form a single-leaf spring, where the sheet is a single sheet that runs longitudinally along both sides of the body and the eyes of the leaf spring and that by having both sides folded creates the eyes of the leaf spring.

8 Claims, 8 Drawing Sheets

(51) Int. Cl.
    *B29C 70/48*     (2006.01)
    *B32B 5/26*     (2006.01)
    *B32B 15/14*     (2006.01)
    *B29K 63/00*     (2006.01)
    *B29K 307/04*     (2006.01)
    *B29K 309/08*     (2006.01)
    *B29K 705/00*     (2006.01)
    *B29L 31/00*     (2006.01)

(52) U.S. Cl.
    CPC ............ *B32B 15/14* (2013.01); *F16F 1/3686* (2013.01); *B29K 2063/00* (2013.01); *B29K 2307/04* (2013.01); *B29K 2309/08* (2013.01); *B29K 2705/00* (2013.01); *B29L 2031/774* (2013.01); *B32B 2260/046* (2013.01); *B32B 2262/101* (2013.01); *B32B 2262/106* (2013.01); *F16F 2224/0208* (2013.01); *F16F 2224/0241* (2013.01); *F16F 2226/04* (2013.01)

(58) Field of Classification Search
    CPC ...... F16F 2226/04; B29B 11/06; B29C 70/48; B32B 5/26; B32B 15/14; B32B 2260/046; B32B 2262/101; B32B 2262/106; B29K 2063/00; B29K 2307/04; B29K 2309/08; B29K 2705/00; B29L 2031/774

See application file for complete search history.

(56) References Cited

U.S. PATENT DOCUMENTS

| 2008/0007022 | A1* | 1/2008 | Jones | B60G 3/10 |
| | | | | 280/124.13 |
| 2015/0343875 | A1* | 12/2015 | Spiegel | F16F 1/368 |
| | | | | 280/5.515 |

FOREIGN PATENT DOCUMENTS

| JP | S57124141 A | * | 1/1982 | ................ F16F 1/30 |
| WO | 2011124814 A1 | | 10/2011 | |

* cited by examiner

SINGLE-LEAF SPRING MADE FROM COMPOSITE MATERIAL WITH A POLYMER MATRIX AND MANUFACTURING METHOD FOR SAID LEAF SPRING

CROSS-REFERENCES TO RELATED APPLICATIONS

This application claims the benefit of the International Application No. PCT/ES2017/070850, filed on Dec. 27, 2017, and of the European patent application No. 16382664.7 filed on Dec. 28, 2016, the entire disclosures of which are incorporated herein by way of reference.

FIELD OF THE INVENTION

The invention is based on the development of a single-leaf spring that combines the use of different composite materials with a polymer matrix, preferably thermostable, for example, epoxy. This solution can be applied both for light and heavy vehicles.

BACKGROUND OF THE INVENTION

Springs have a body that has an upper side and a lower side and two eyes located at the opposing longitudinal ends of the body, which are designed to connect to the vehicle where the spring is installed.

A single-leaf spring is one that is formed by a single leaf, or solid, regardless of the type of material from which it is made.

Those with one or several leaves are also known as leaf springs made from composite materials, also known are the hybrid springs that comprise a body made from composite material while their eyes are made from metal materials. A composite material leaf spring is understood to be a single-leaf comprising a set of fiber plies, for instance, fiberglass or carbon fiber, embedded in a polymer matrix.

In the case of single and multiple-leaf springs, both their dimensions and their shape are determined firstly by the requirements for mounting them on the vehicle where they will be installed; secondly by the movement or deformation of the leaf spring on the vehicle's Z axis and thirdly by the desired amount of rigidity due to the stress the leaf spring will have to withstand during use.

The stress levels a single-leaf spring will have to withstand are generally greater than those of double or multiple-leaf springs for the same load and rigidity conditions. This is because all the tensions that the suspension has to withstand are withstood by a single-leaf.

Taking the foregoing into account, one of the disadvantages of single-leaf springs made from composite materials occurs in the area around their eyes. The tensions this area needs to withstand and the problems of how these eyes are configured and built generate a multitude of disadvantages that do not exist in leaf springs that are configured based on several metal leaves where the eyes are built from this same material.

Owing to the characteristics of the stresses that occur in the area of the eyes when the truck brakes and during the addition of the bushings in the leaf spring eyes, tensions arise in the X- and Z-axes of the composite material sheet, which causes delamination to begin in the area around the eye and the leaf spring to fail completely due to this delamination.

In addition to this previous problem in the leaf spring eyes, this type of leaf spring has another disadvantage that is derived from the mechanical properties of the composite material. The mechanical properties of the composite material are inferior to those of steel, which makes it necessary to increase the thickness of the leaf spring along its entire length, with its maximum thickness being at its center. This increase in thicknesses means that the composite material spring leaf can withstand the same loads as a metal spring leaf.

The problem that is generated with this increase in thicknesses is that it could make difficult the assembly of the leaf spring on the truck, with this maximum thickness limited by a certain value determined by the shape of the space in which the leaf spring is contained.

Another additional disadvantage of leaf springs built from composite material is the price of their material, because the price of the fiber and the resin is higher than the price of steel.

Falling within the category of state of the art, various leaf spring designs are known for solving the problems mentioned above. For example, various leaf springs and leaf spring eye production processes are known, yet nevertheless none of them are able to satisfactorily solve either the problem of the leaf spring's resistance to stresses or more importantly, to achieve a simple production process that can be automated.

SUMMARY OF THE INVENTION

Both this invention and its production process solve the problems mentioned above that have prevented leaf springs from functioning correctly.

The leaf spring and the manufacturing method that are the subject of the invention are able to solve the problems of delamination and breakage in both the body and the eyes of the leaf spring. This way a dynamic behavior is achieved that is equal to or greater than single-leaf springs built entirely from steel and a 50%, or 70% weight reduction is achieved compared to the metal solution.

The leaf spring of the invention comprises at least one sheet of composite material, formed by a series of fiber plies embedded in a polymer matrix, where the composite material sheet is a single sheet that extends longitudinally on both sides of the body and on the eyes of the leaf spring and where the leaf spring's eyes are configured at the fold between its two sides. The set of fiber plies is embedded in the polymer matrix, therefore, comprising a leaf spring built from a single-leaf.

This description presents two examples of embodiments of the leaf spring in this invention that arise from different technical, geometric or economic requirements:

Example of embodiment 1: A single-leaf spring built entirely from fiber, for example from fiberglass or carbon fiber, embedded in a polymer matrix, for example a thermostable epoxy matrix.

Example of embodiment 2: A single-leaf spring combining different materials such as fiber and a metal material. By way of example, the plies may be made from fiberglass or carbon fibers and the metal material may be steel sheets, all of which would be embedded in a polymer matrix, for example thermostable epoxy, such that a spring built from a single-leaf would be defined. This embodiment has the advantage whereby the combination of plastic composite material and metal sheets reduces the use of fiber and, therefore, lowers the total cost of the leaf spring's raw materials.

The leaf spring in the invention can be built using any of the currently existing Resin Transfer Molding (RTM) processes, such as for example:

Low pressure RTM (LP-RTM)
High pressure RTM (HP-RTM)
High pressure Compression (HP-CRTM)

To do this, the production process for the single-leaf spring of the invention comprises the following steps:

positioning a set of fiber plies in a forming tool,
positioning two male ends on the fiber plies to configure the eyes of the leaf spring,
folding the fiber plies on the male ends to configure the eyes of the leaf spring,
preforming the aforementioned assembly,
positioning the preform in a resin transfer injection mold (RTM),
injecting polymer resin,
forming a single-leaf spring comprising the series of fiber plies embedded in the polymer matrix.

One of the most important parts of the aforementioned process and, therefore, of the leaf spring, is the process of laminating the eyes, since these eyes are created during a stage when the preform is created making use of the same fiber plies that comprise the body of the leaf spring upon being folded around the male end. This male end may be cylindrical with an appropriate diameter.

This way the main body of the leaf spring is generated by whole plies initially positioned on one of the sides of the leaf spring that, after being rotated around the male ends to create the eyes and then creating the other side of the leaf spring. The manufacturing method can be applied to both elliptical and parabolic leaf spring profiles.

The manufacturing process for the single-leaf spring of the invention also has two embodiments based on the leaf spring embodiments in accordance with the indications above.

The steps that define the manufacturing process for the aforementioned embodiment 1 are:

Positioning in the forming tool for shaping the fiber plies, for example fiberglass that forms the sheet.
Positioning two male ends on the fiberglass plies to configure the eyes of the leaf spring. Additionally, both male ends are covered with a braiding ply made from carbon fiber. The braiding ply comprises a series of continuous braided fibers that comprise a tubular fiber preform.
Folding the fiber plies on the male ends to configure the eyes and the upper side of the leaf spring.
Closing the forming tool to preform the aforementioned assembly. In order to preform it, the material shall preferably contain a binder and pressure and temperature should be applied for a given time period.
Once the fiber layers have been created to form a sheet, a stitch can be made on the flat area of the eyes.
Positioning the preform in an injection mold to proceed to the process of injecting using any of the RTM variants.

The steps that define the production process for the aforementioned named as embodiment 2 are:

Positioning at least one set of fiber plies in the forming tool, for example, fiberglass.
Positing in the forming tool or mold at least one sheet of metal material on the fiberglass plies.
Positioning two male ends on the fiberglass plies to configure the eyes of the leaf spring. As in the previous embodiment, a braiding ply made from carbon fiber may be positioned on the male ends.
Folding the fiber plies ends on the male ends with the braiding in order to configure the eyes and the upper side of the leaf spring.
Closing the forming tool to preform the aforementioned assembly. In order to preform it, the material may preferably contain a binder and pressure and temperature should be applied for a given time period.
Once the fiber plies have been created to form a sheet, stitches can be made on the flat area of the eyes.
Positioning the preform in an injection mold to proceed to the process of injection using any of the RTM variants.

BRIEF DESCRIPTION OF THE DRAWINGS

In order to complete the description and with the goal of providing a better understanding of the invention, some figures have been provided. These figures are an integral part of the description and they illustrate embodiments of the invention.

DETAILED DESCRIPTION OF THE PREFERRED EMBODIMENTS

Figure 1:
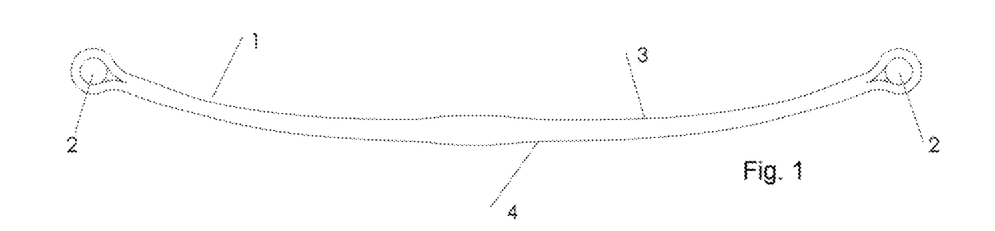
FIG. 1 is a general side view of an embodiment of the leaf spring of the invention.

FIG. 1 shows a leaf spring as in the invention that comprises a body (1) and two eyes (2) at the ends of the body (1) and an upper side (3) and a lower side (4).

Figure 2:
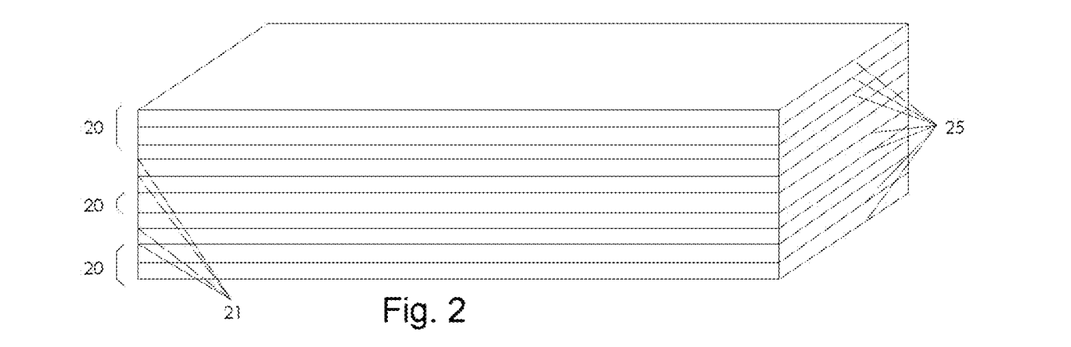
FIG. 2 is a longitudinal section of the embodiment named as embodiment 1.

FIG. 2 shows a longitudinal cross-section of the embodiment of the leaf spring named as embodiment 1, which shows that the leaf spring is comprised a sheet (20) that is in turn comprised by various fiberglass plies (25).

Figure 3:
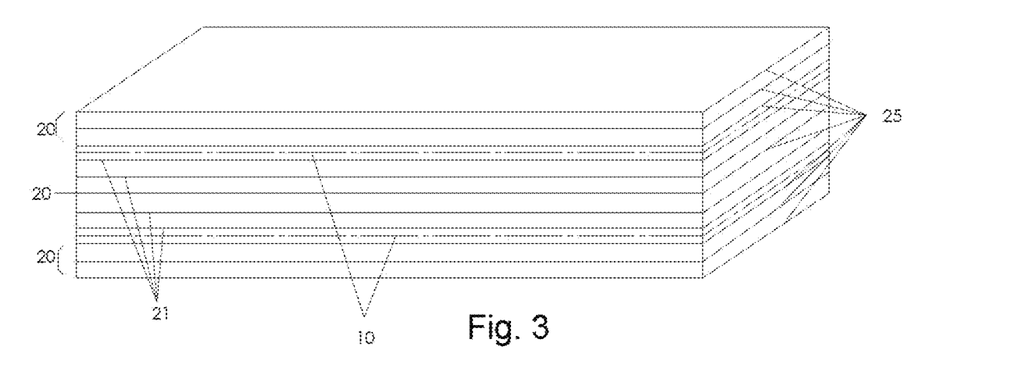
FIG. 3 is a longitudinal section of a first embodiment of the embodiment named as embodiment 2, which contains two metal sheets.

FIG. 3 shows a longitudinal cross-section of a first embodiment of the leaf spring pertaining to the embodiment named as embodiment 2, which shows that the leaf spring is comprised by various fiberglass plies (25) and two metal material sheets (10).

Figure 4:
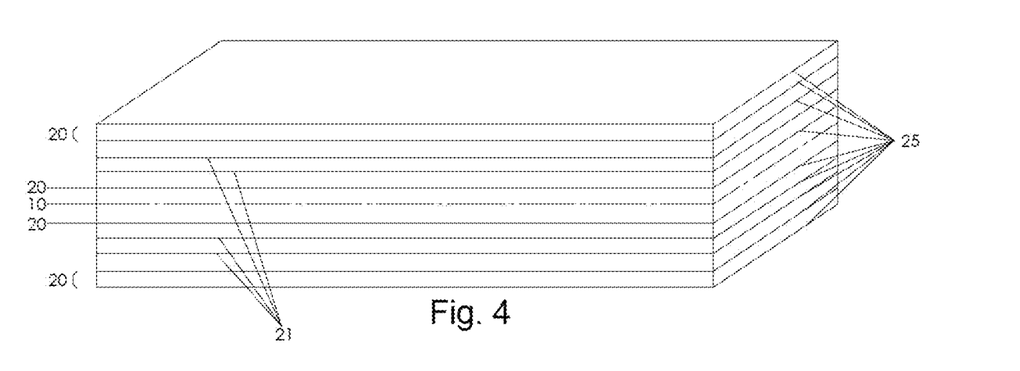
FIG. 4 is a longitudinal section of a second embodiment of the embodiment named as embodiment 2, which contains a single metal sheet.

FIG. 4 shows a longitudinal cross-section of a second embodiment of the leaf spring pertaining to the embodiment named as embodiment 2, which shows that the leaf spring is comprised by various fiberglass plies (25) and a metal material sheet (10).

Figure 5:
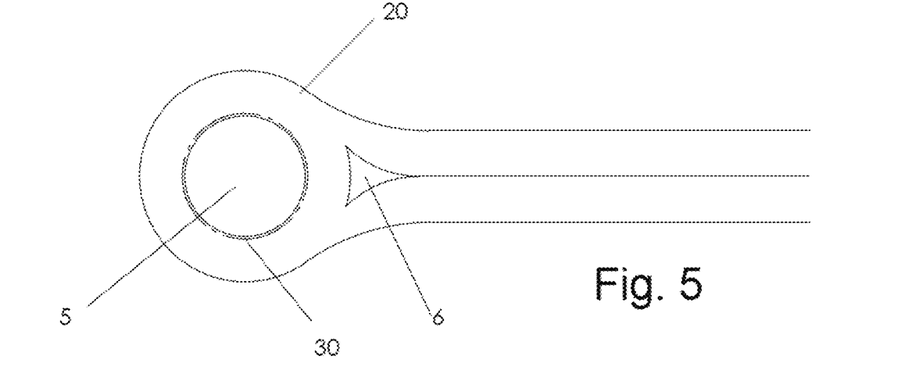
FIG. 5 is a schematic side view of the detail of the lamination of an eye from an embodiment of the leaf spring of the invention.

FIG. 5 shows a detailed view of the eyes (2) of the leaf spring of the invention in which a single composite material sheet (20) comprising various fiberglass plies (25) surrounds the male end (5) that in turn is covered with a braiding ply (30) made from carbon fiber. The male ends (5) and the composite material sheet (20) define the eyes (2) of the leaf spring, with the composite material sheet (20) running from the lower side (4) of the leaf spring to the upper side (3) of the leaf spring.

Figure 6:
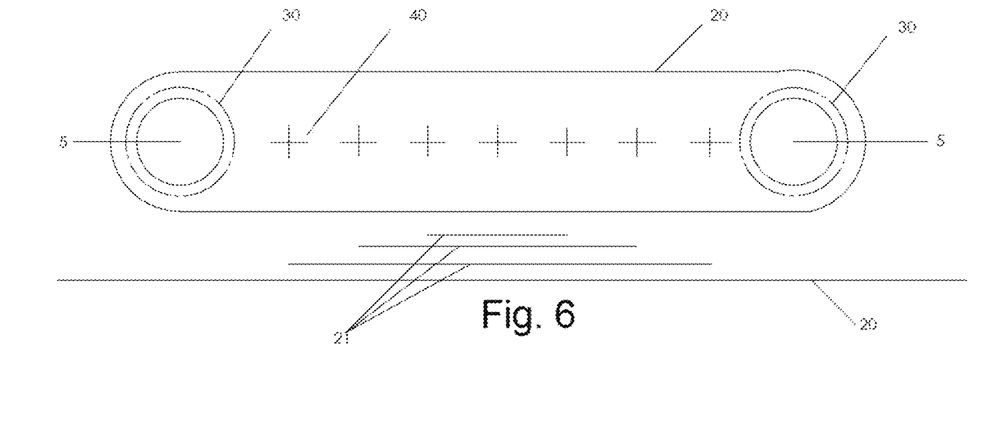
FIGS. 6 and 7 show a lamination scheme of a first embodiment of the leaf spring from the embodiment named as embodiment 1, which contains two composite material sheets that form the upper and lower sides and the eyes of the leaf spring.
Figure 7:
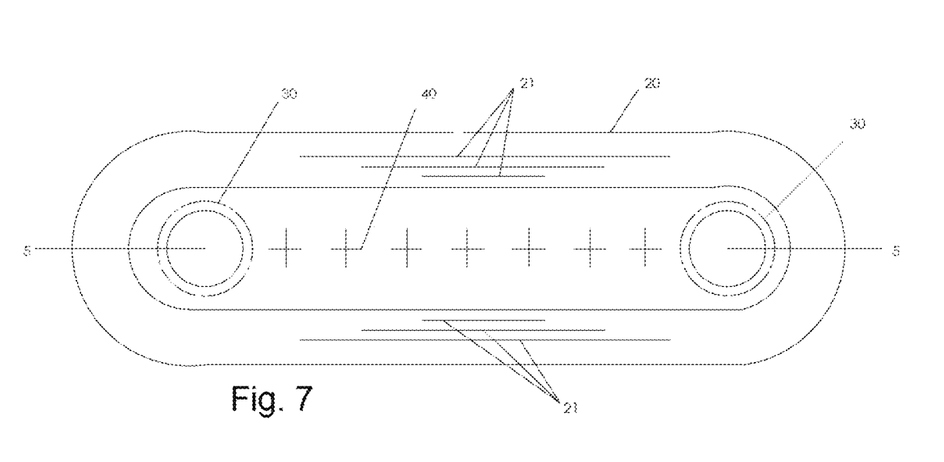

FIGS. 6 and 7 show a first embodiment of the embodiment named as embodiment 1 of the single-leaf spring. In this first embodiment of embodiment 1 there are continuous fiberglass sheets (20) comprising fiberglass plies (25) that run along both sides (3, 4) of the leaf spring and that comprise the body (1) and the eyes (2) of the leaf spring. The body (1) is comprised fiberglass plies (25) that form a sheet (20) and of a local reinforcement (21) comprising various fiberglass plies of different lengths. All of this is in accordance with the profile of the leaf spring.

The manufacturing method for this embodiment comprises the following steps:

1°—Cutting the Plies (25)

Each of the plies (25) are cut, including both the whole plies (25) and the local reinforcement plies (21), to the dimensions specified in their corresponding laminate level.

After cutting, a binder may be applied to each of them, in the event that it was not applied at the factory. In addition to this and depending on the thickness of the leaf spring, an internal flow facilitation ply (40) will be cut that will be positioned at the center of the sheet to facilitate the flow of resin during injection so that the leaf spring will be impregnated correctly.

2°—Lamination and Generation of the Preform

In order to obtain the lamination scheme shown in FIGS. 6 and 7 when the preform is generated, a process is conducted that comprises the following steps:

The whole plies (25) of the most exterior sheet (20) of the leaf spring are placed on a forming tool.

The reinforcement plies (21) are placed on the aforementioned sheet (20).

A second set of whole plies (25) are inserted that constitute the internal sheet (20), i.e., the sheet furthest inside the leaf spring.

The resin impregnation facilitation sheet (40) is inserted depending on the thickness of the leaf spring.

The male ends (5) and the carbon fiber braiding (30) are inserted that form the eyes (2) in their corresponding position.

The plies (25) of the sheet (20) furthest inside are folded on the male ends (5) such that the upper side (3) of the leaf spring is formed with the same sheet as the lower side (4) that also defines the eyes (2). In this stacking, the plies (25) are placed so that their ends do not end at the same transversal section, but are rather staggered to better distribute stress at the connection of the two sheet ends (20).

The reinforcement sheet plies (21) are placed on the plies (25) of the lower side (4).

Figure 14:
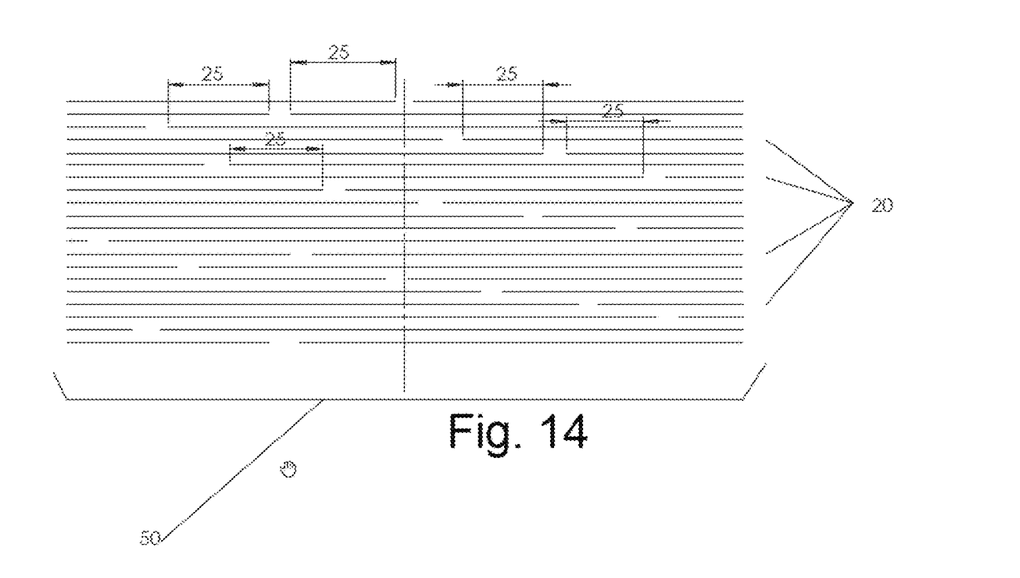
FIG. 14 shows a schematic view of an embodiment of the interconnection of the ends of the composite material sheet plies.

The plies (25) of the most outlying sheet (20) are folded on the male ends (5) of the eyes (2) in order to create both the eyes (2) and the upper side (3) of the leaf spring. As with the inner sheet (20), the ends of the plies (25) are staggered. This staggering (see FIG. 14) should be done in the flat area (50) of the leaf spring, which is in the same area where the bushing is located. This ensures that the plies (25) are not lying in the same transversal position, therefore, correctly distributing stresses.

3°—Filling of the Hollow

The hollow area around the male end (5) left after the folding of the fiberglass plies (25) to create the eye (2) should be filled to prevent excess resin that would result in a weak area where delamination might originate in the central area of the leaf spring. To do this, a fiberglass part (6) with binder is used called roving with the proper shape (see FIG. 5). The shape of the roving is created using pressure and temperature until the required form is obtained.

4°—Shaping

Once the sheet is completed on the tool and with the roving placed in its correct position, the tool is closed and heated for the proper time and the right temperature for the binder to meld. This way the preform is created.

5°—Stitching (23)

Figure 15:
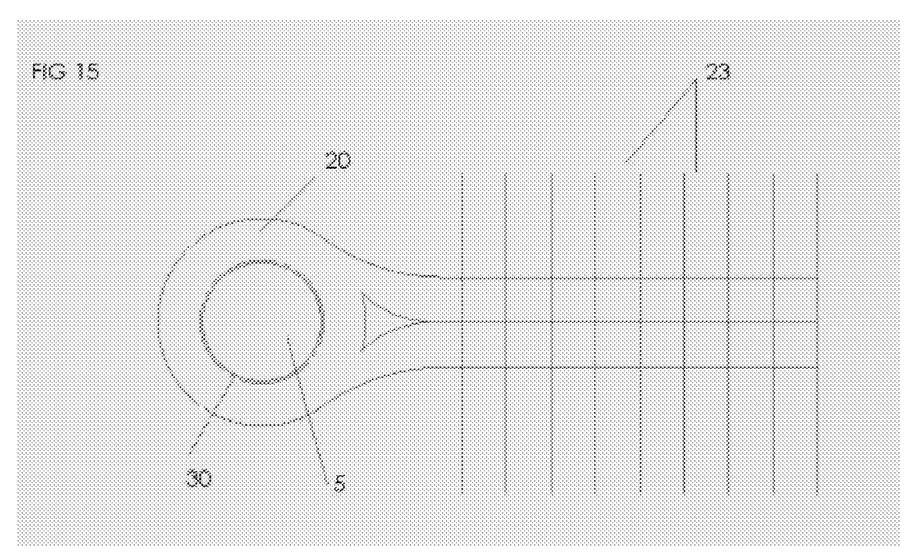
FIGS. 15 and 16 show a lateral level view of an embodiment of a sheet stitching in the eye area of the leaf spring.
Figure 16:
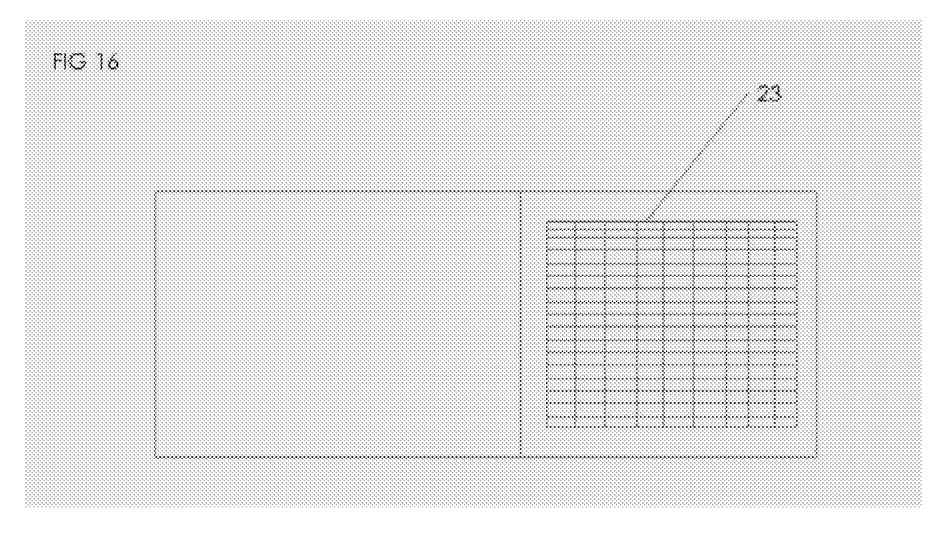

Owing to the low resistance of the composite material sheet (20) to loads transmitted in the normal direction to it (whether normal loads or shear loads), it needs to be reinforced in the area around the eyes (2) so that it can withstand the forces that will arise when the truck brakes. In order to achieve this, a stitching technique (23) is used whereby the upper side (3) and the lower side (4) of the fiberglass sheet (20) are stitched around the eye (2) of the leaf spring using reinforced string such that resistance is added to the sheet (20) in its normal direction, therefore, preventing the two sides (3, 4) from separating from each other. The stitching (23) is done in the area of the eye (2) as shown in the scheme of FIGS. 15 and 16. The distance between the stitches is not based on the size of the leaf. The number of stitches (23) comprising the leaf depends on the leaf's size. In both cases, it has been calculated using finite elements, therefore, ensuring the integrity of the sheet and guaranteeing the desired dynamism.

The stitching (23) is performed once it has been removed from the tool with the preform hardened. This process is conducted using a stitching robot that ensures the automation of the process. The stitch number and distance parameters will be followed that can be seen in FIGS. 15 and 16.

The distance between stitches and the number of rows also depends on the type of leaf spring and the type of string being used.

6°—Injection

The preform is placed in the mold again and it is then injected following the parameters for the required number of cycles, for the resin/hardener mixture and for the pressure using any of the RTM techniques.

Figure 8:
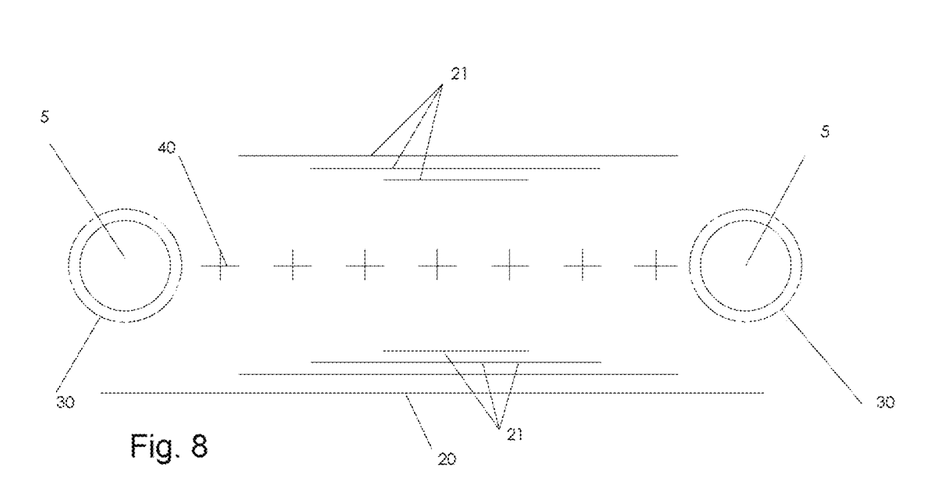
FIGS. 8 and 9 show a lamination scheme of a second embodiment of the leaf spring from the embodiment named as embodiment 1, which contains a single composite material sheet that comprises the upper and lower sides and the eyes of the leaf spring.
Figure 9:
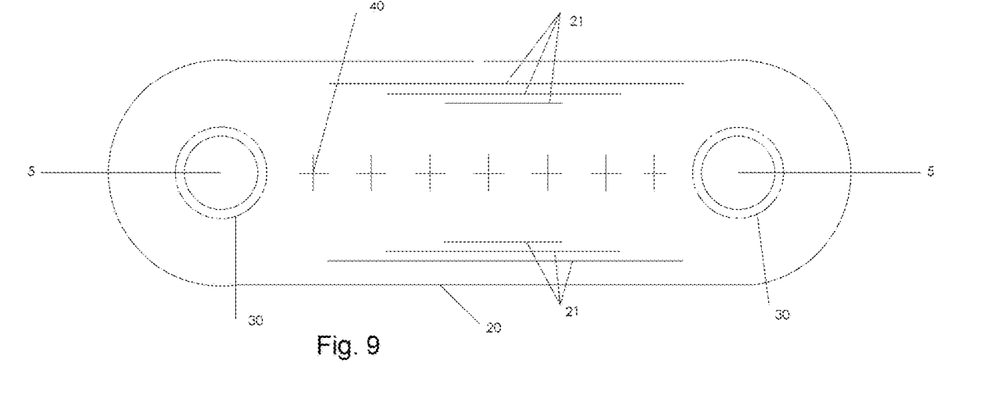

FIGS. 8 and 9 show a second embodiment of the embodiment named as embodiment 1. In this second embodiment there are continuous fiberglass plies (25) that form a single sheet (20) that runs along both sides (3, 4) of the leaf spring and that form the body (1) and the eyes (2) of the leaf spring. The body (1) is comprised of fiberglass plies (25) that form a sheet (20) and also of an internal reinforcement (21) formed by various fiberglass plies (25) of different lengths. All of this forms the profile of the leaf spring.

The manufacturing method for this second embodiment comprises the following steps:

1°—Cutting the plies (25)

Each of the plies (25) is cut, including both the whole plies (25) and the local reinforcement plies (21), to the dimensions specified in their corresponding laminate level.

After cutting, a binder may be applied to each of them, in the event that it was not applied at the factory. In addition to this and depending on the thickness of the leaf spring, an internal flow facilitation ply (40) will be cut that will be positioned at the center of the sheet to facilitate the flow of resin during injection so that the leaf spring will be impregnated correctly.

2°—Lamination and Generation of the Preform

In order to obtain the lamination scheme shown in FIGS. 8 and 9 when the preform is generated, a process is conducted that comprises the following steps:

The whole plies (25) of the sheet (20) of the leaf spring are placed on a forming tool.

The reinforcement plies (21) are placed on the aforementioned sheet (20).

The resin impregnation facilitation ply (40) may optionally be inserted depending on the thickness of the leaf spring.

The reinforcement plies (21) are placed on the impregnation facilitation sheet (40), The male ends (5) and the carbon fiber braiding (30) are located in their corresponding position forming the eyes (2).

The plies (25) of the fiberglass sheet (20) are folded on the male ends (5) of the eyes (2) in order to create both the eyes (2) and the upper side (3) of the leaf spring. The ends of the plies (25) are staggered. This staggering should be done in the flat area of the leaf spring which is in the same area where the bushing is located. This ensures that the plies (25) are not lying in the same position, therefore, correctly distributing stresses.

3°—Filling of the Hollow

The hollow area around the male end (5) left after the folding of the fiberglass plies (25) to create the eye (2) should be filled to prevent excess resin that would result in a weak area where delamination might originate in the central area of the leaf spring. To do this a fiberglass part (6) with binder with the proper shape is used, called roving. The shape of the roving binder is created using pressure and temperature until the required form is obtained.

4°—Shaping

Once the sheet is completed on the tool and with the roving placed in its correct position, the tool is closed and heated for the proper time and the right temperature for the binder to meld. This way the preform is created.

5°—Stitching (23)

Owing to the low resistance of the composite material sheet (20) to loads transmitted in the normal direction to it (whether normal loads or shear loads), it needs to be reinforced in the area around the eyes (2) so that it can withstand the forces that will arise when the truck brakes. In order to achieve this, a stitching technique (23) is used whereby the upper side (3) and the lower side (4) of the fiberglass sheet (20) are stitched around the eye (2) of the leaf spring using reinforced string such that resistance is added to the sheet (20) in its normal direction, therefore, preventing the two sides (3, 4) from separating from each other. The stitching (23) is done in the area of the eye (2) as shown in the scheme of FIGS. 15 and 16. The distance between the stitches is not based on the size of the leaf. The number of stitches (23) comprising the leaf depends on the leaf's size. In both cases, it has been calculated using finite elements, therefore, ensuring the integrity of the sheet and guaranteeing the desired dynamism.

The stitching (23) is performed once it has been removed from the tool with the preform hardened. This process is conducted using a stitching robot that ensures the automation of the process. The stitch number and distance parameters will be followed that can be seen in FIGS. 15 and 16.

The distance between stitches and the number of rows also depends on the type of leaf spring and the type of string being used.

6°—Injection

The preform is placed in the mold again and it is then injected following the parameters for the required number of cycles, for the resin/hardener mixture and for the pressure using any of the RTM techniques.

Figure 10:
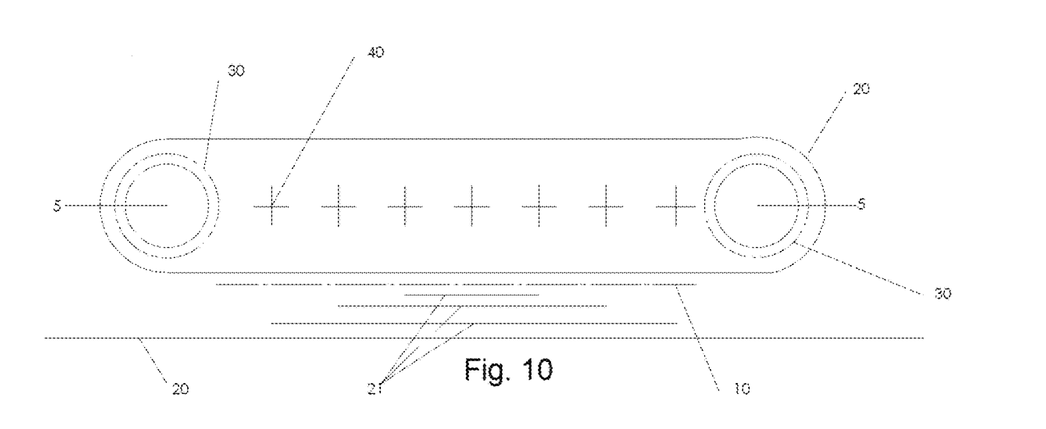
FIGS. 10 and 11 show a lamination scheme of a first embodiment of the leaf spring from the embodiment named as embodiment 2, which has two composite material sheets and two metal sheets.
Figure 11:
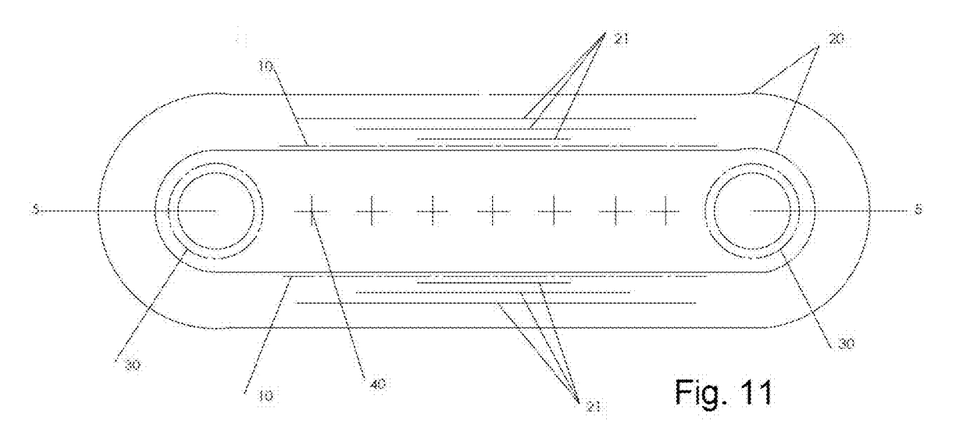

FIGS. 10 and 11 show a first embodiment of the embodiment named as embodiment 2 of the single-leaf spring. In this first embodiment of embodiment 2, there are fiberglass plies (25) that form two composite sheets (20) and two steel sheets (10) located between the two sides of the sheet furthest inside (20) and the local reinforcement (21). All of these elements form the profile of the leaf spring.

The manufacturing method for this first embodiment of the second version of the leaf spring object of the invention comprises the following steps:

1°—Cutting the Plies (25).

Each of the plies (25) are cut, including both the whole plies (25) and the local reinforcement plies (21), to the dimensions specified in their corresponding laminate level.

After cutting, a binder may be applied to each of them, in the event that it was not applied at the factory. In addition to this and depending on the thickness of the leaf spring, an internal flow facilitation ply (40) will be cut that will be positioned at the center of the sheet to facilitate the flow of resin during injection so that the leaf spring will be impregnated correctly.

2°—Cutting the Steel Sheets.

Cutting of metal material sheets (10), for example steel that is 1.5 mm thick and 60 mm wide. The length of the sheet (10) runs from one parabolic area of the leaf spring to the other. The dimensions of the steel sheet have been calculated using finite elements in order to ensure the dimensions of the sheets will be optimal and to give the sheet the desired dynamic behavior.

3°—Lamination and Generation of the Preform

In order to obtain the lamination scheme shown in FIGS. 10 and 11 when the preform is generated, a process is conducted that comprises the following steps:

The whole plies (25) of the most exterior sheet (20) of the leaf spring are placed on the tool.

The reinforcement plies (21) are placed on the aforementioned sheet (20).

The first sheet of metal material (10) is placed, which may be a tempered, hardened steel sheet.

The second whole sheet (20) is placed, i.e., the sheet furthest inside the leaf spring.

The resin impregnation facilitation ply (40) is placed.

The male ends (5) that comprise the eyes (2) are placed in their corresponding position.

The plies (25) of the sheet (20) furthest inside are folded on the male ends (5) such that the upper side (3) of the leaf spring is formed with the same sheet as the upper side (4) that also defines the eyes (2). In this stacking the plies (25) are placed so that their ends do not end at the same transversal section, but are rather staggered to better distribute stress at the connection of the two ends of the whole sheet (20).

The second sheet of metal material (10) is placed on the upper side (3) of the internal sheet (20).

The reinforcement sheet plies (21) of the upper side (3) are placed on the metal sheet (10) of the upper side (3).

The plies (25) of the most outlying sheet (20) are folded on the male ends (5) of the eyes (2) in order to create both the eyes (2) and the upper side (3) of the leaf spring. As with the inner sheet (20), the ends of the plies (25) are staggered. This staggering (see FIG. 14) should be done in the flat area (50) of the leaf spring that is in the same area where the bushing is located. This ensures that the plies (25) are not lying in the same position, therefore, correctly distributing stresses.

4°—Filling of the Hollow.

The hollow area around the male end (5) left after the folding of the fiberglass sheet (20) to create the eye (2) should be filled to prevent excess resin that would result in a weak area where delamination might originate in the central area of the leaf spring. To do this a fiberglass part (6) with binder with the proper shape is used, called roving. The shape of the roving is created using pressure and temperature until the required form is obtained.

5°—Shaping

Once the sheet is completed on the tool and with the roving placed in its correct position, the tool is closed and heated for the proper time and the right temperature for the binder to meld. This way the preform is created.

6°—Stitching (23)

Owing to the low resistance of the composite material sheet (20) to loads transmitted in the normal direction to it (whether normal loads or shear loads), it needs to be reinforced in the area around the eyes (2) so that it can withstand the forces that will arise when the truck brakes. In order to achieve this, a stitching technique (23) is used whereby the upper side (3) and the lower side (4) of the fiberglass sheet (20) are stitched around the eye (2) of the leaf spring using reinforced string such that resistance is added to the sheet (20) in its normal direction, therefore, preventing the two sides (3, 4) from separating from each other. The stitching (23) is done in the area of the eye (2) as shown in the scheme of FIGS. 15 and 16. The distance between the stitches is not based on the size of the leaf. The number of stitches (23) comprising the leaf depends on the leaf's size. In both cases, it has been calculated using finite elements, therefore, ensuring the integrity of the sheet and guaranteeing the desired dynamism.

The stitching (23) is performed once it has been removed from the tool with the preform hardened. This process is conducted using a stitching robot that ensures the automation of the process. The stitch number and distance parameters will be followed that can be seen in FIGS. 15 and 16.

The distance between stitches and the number of rows also depends on the type of leaf spring and the type of string being used.

7°—Injection

The preform is placed in the mold again and it is then injected following the parameters for the required number of cycles, the resin/hardener mixture and the pressure using any of the RTM techniques.

Figure 12:
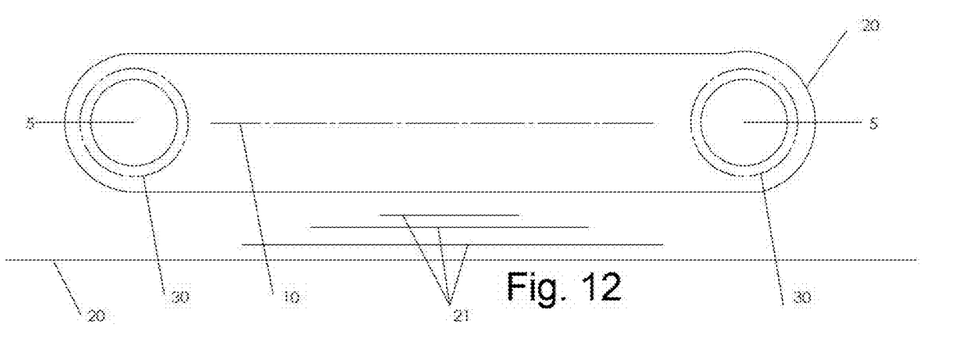
FIGS. 12 and 13 show a lamination scheme of a second embodiment of the leaf spring from the embodiment named as embodiment 2, which has two composite material sheets and one metal sheet.
Figure 13:
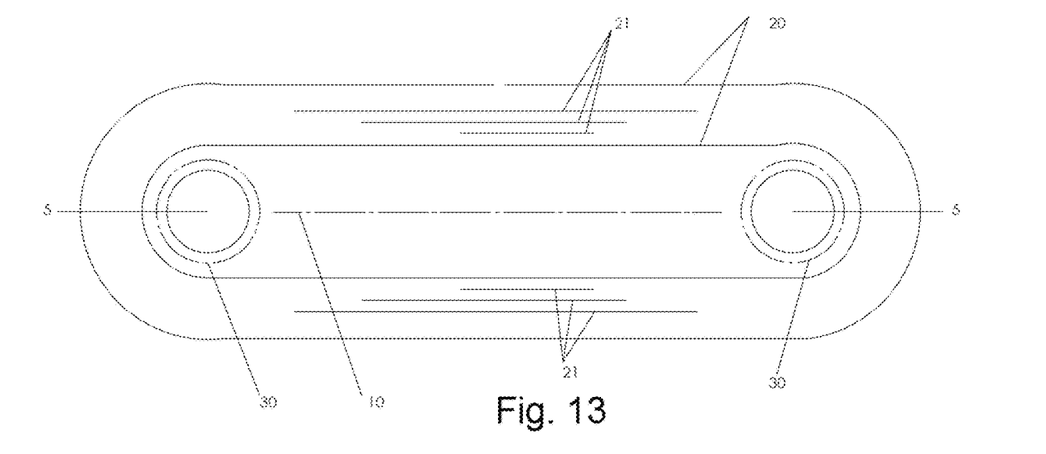

FIGS. 12 and 13 show a second embodiment of the single-leaf spring corresponding to the embodiment named as embodiment 2.

In this second embodiment of embodiment 2, there are fiberglass plies (25) that form the composite material sheet (20) that extends across both sides (3, 4) of the leaf spring and that form the body (1) and the eyes (2) of the leaf spring and a metal sheet (10) located between the two sides of the continuous sheet (20) and the internal reinforcement (21). All of these elements form the profile of the leaf spring.

The production process for this third embodiment comprises the following steps:

1°—Cutting the Plies (25)

Each of the plies (25) is cut, including both the whole plies (25) and the local reinforcement plies (21), to the dimensions specified in their corresponding laminate level.

After cutting, a binder may be applied to each of them, in the event that it was not applied at the factory. In addition to this and depending on the thickness of the leaf spring, an internal flow facilitation ply (40) will be cut that will be positioned at the center of the sheet to facilitate the flow of resin during injection so that the leaf spring will be impregnated correctly.

2°—Cutting of the Steel Sheets (10)

Cutting, for example, a steel sheet that is 1.5 mm thick and 60 mm wide. The length of the metal sheet (10) runs from one parabolic area of the leaf spring to the other. The dimensions of the steel sheet have been calculated using finite elements in order to ensure the dimensions of the sheets will be optimal and to give the sheet the desired dynamic behavior.

3°—Lamination and Generation of the Preform

In order to obtain the lamination scheme shown in FIGS. 12 and 13 when the preform is generated, a process is conducted that comprises the following steps:

The whole plies (25) of the most exterior sheet (20) of the leaf spring are placed on a mold.

The reinforcement plies (21) are placed on the aforementioned sheet (20).

The metal material sheet (10) is placed, which may be a tempered, hardened steel sheet.

The reinforcement sheet plies (21) of the upper side (3) are placed on the metal sheet (10) of the upper side (3).

The male ends (5) that form the eyes (2) are placed in their corresponding position.

The plies (25) of the most outlying sheet (20) are folded on the male ends (5) of the eyes (2) in order to create both the eyes (2) and the upper side (3) of the leaf spring. As with the inner sheet (20), the ends of the plies (25) are staggered. This staggering (see FIG. 14) should be done in the flat area (50) of the leaf spring that is in the same area where the bushing is located. This ensures that the plies are not lying in the same position, therefore, correctly distributing stresses 4°—Filling of the Hollow The hollow area around the male end (5) left after the folding of the fiberglass plies (25) to create the eye (2) should be filled to prevent excess resin that would result in a weak area where delamination might originate in the central area of the leaf spring. To do this a fiberglass part (6) is used with a roving with the proper shape. The shape of the roving is created using pressure and temperature until the required form is obtained.

5°—Shaping

Once the sheet is completed on the tool and with the roving placed in its correct position, the mold is closed and heated for the proper time and the right temperature for the binder to meld. This way the preform is created.

5°—Stitching (23)

Owing to the low resistance of the composite material sheet (20) to loads transmitted in the normal direction to it (whether normal loads or shear loads), it needs to be reinforced in the area around the eyes (2) so that it can withstand the forces that will arise when the truck brakes. In order to achieve this, a stitching technique (23) is used whereby the upper side (3) and the lower side (4) of the fiberglass sheet (20) are stitched around the eye (2) of the leaf spring using reinforced string such that resistance is added to the sheet (20) in its normal direction, therefore, preventing the two sides (3, 4) from separating from each other. The stitching (23) is done in the area of the eye (2) as shown in the scheme of FIGS. 15 and 16. The distance between the stitches is not based on the size of the leaf. The number of stitches (23) comprising the leaf depends on the leaf's size. In both cases, it has been calculated using finite elements, therefore, ensuring the integrity of the sheet and guaranteeing the desired dynamism.

The stitching (23) is performed once it has been removed from the mold with the preform hardened. This process is conducted using a stitching robot that ensures the automation of the process. The stitch number and distance parameters will be followed that can be seen in FIGS. 15 and 16.

The distance between stitches and the number of rows also depends on the type of leaf spring and the type of string being used.

6°—Injection.

The preform is placed in the mold again and it is then injected following the parameters for the required number of cycles, the resin/hardener mixture and the pressure using any of the RTM techniques.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A single-leaf spring comprising:
   an elongated body,
   two eyes located near ends of the body, with the body having an upper side and a lower side,
   the body comprising:
      at least one composite material sheet formed by a set of fiber plies embedded in a polymer matrix to form a single-leaf spring, where the sheet is a single sheet that runs longitudinally along the upper and the lower sides of the body and eyes of the leaf spring and which, by having both sides of the sheet folded, creates the eyes of the leaf spring; and,
      a stitching of the at least one composite material sheet between the upper side and the lower side near the eyes of the leaf spring,
   wherein the polymer matrix is cured, and
   wherein the stitching comprises an outer surface not embedded in the cured polymer matrix.

2. The single-leaf spring, according to claim 1, further comprising at least one metal material sheet that runs longitudinally along the body of the leaf spring, with the polymer matrix injected in and around both the composite material sheet and the metal material sheet, such that the metal material sheet and the composite material sheet form a single-leaf spring.

3. The single-leaf spring, according to claim 1, further comprising at least one reinforcement sheet formed by a set of fiber plies embedded in a polymer matrix that runs longitudinally along a center of the leaf spring's body.

4. The single-leaf spring, according to claim 1, further comprising a second composite material sheet that runs longitudinally along the upper and the lower sides of the body and the eyes of the leaf spring, and that by having both sides of the second composite material sheet folded, forms the eyes of the leaf spring.

5. The single-leaf spring, according to claim 2, further comprising a second composite material sheet that runs longitudinally along the upper and the lower sides of the body and the eyes of the leaf spring, and that by having both sides of the second composite material sheet folded, forms the eyes of the leaf spring, comprising two metal material sheets, each of which are located between the first and the second composite material sheet on the upper side and lower side of the leaf spring.

6. The single-leaf spring, according to claim 2, further comprising a second composite material sheet that runs longitudinally along the upper and the lower sides of the body and the eyes of the leaf spring, and that by having both sides of the second composite material sheet folded, forms the eyes of the leaf spring, wherein the metal material sheet is located between the two sides of the sheet located farthest inside the leaf spring.

7. The single-leaf spring, according to claim 1, wherein an opening forming the eye comprises a carbon fiber braided covering.

8. The single-leaf spring, according to claim 1, wherein both ends of each ply that forms the composite material sheet are connected to each other in a staggered manner.

* * * * *